United States Patent
Fink et al.

(10) Patent No.: US 7,160,566 B2
(45) Date of Patent: Jan. 9, 2007

(54) FOOD SURFACE SANITATION TUNNEL

(75) Inventors: Ronald G Fink, Jupiter, FL (US); Walter Ellis, Jupiter, FL (US); Charles Pearsal, Stuart, FL (US)

(73) Assignee: BOC, Inc., Murray Hill, NJ (US)

( * ) Notice: Subject to any disclaimer, the term of this patent is extended or adjusted under 35 U.S.C. 154(b) by 0 days.

(21) Appl. No.: 10/248,671

(22) Filed: Feb. 7, 2003

(65) Prior Publication Data
US 2004/0156959 A1    Aug. 12, 2004

(51) Int. Cl.
*A23B 4/056* (2006.01)
*A61L 2/00* (2006.01)

(52) U.S. Cl. ............... 426/235; 426/248; 426/320; 426/399; 422/24; 422/27

(58) Field of Classification Search ............ 426/399, 426/320, 235, 248; 422/24, 27
See application file for complete search history.

(56) References Cited

U.S. PATENT DOCUMENTS

| | | | |
|---|---|---|---|
| 1,782,822 A | | 11/1930 | Hechenbleikner |
| 2,848,958 A | | 8/1958 | Kolmar |
| 3,336,099 A | | 8/1967 | Czulak et al. |
| 3,954,381 A | | 5/1976 | Marecaux |
| 4,013,023 A | | 3/1977 | Lombana et al. |
| 4,028,246 A | | 6/1977 | Lund et al. ............... 210/151 |
| 4,094,237 A | | 6/1978 | Riordan .................... 99/451 |
| 4,141,830 A | | 2/1979 | Last |
| 4,156,652 A | * | 5/1979 | Wiest ..................... 422/186.3 |
| 4,175,140 A | * | 11/1979 | Bachmann et al. ......... 426/399 |
| 4,179,616 A | | 12/1979 | Coviello et al. |
| 4,204,956 A | | 5/1980 | Flatow |
| 4,323,437 A | | 4/1982 | Mucenieks ................ 204/98 |
| 4,400,270 A | | 8/1983 | Hillman ................... 210/103 |
| 4,427,636 A | | 1/1984 | Obenshain ............... 422/186.07 |
| 4,469,951 A | | 9/1984 | Coco et al. ............... 250/494.1 |
| 4,474,121 A | | 10/1984 | Lewis |
| 4,482,809 A | | 11/1984 | Maarschalkerweerd ..... 250/436 |

(Continued)

FOREIGN PATENT DOCUMENTS

WO    WO 2004/095953 A2 * 11/2004

OTHER PUBLICATIONS

Ronald G. Fink, Photoionization PHI, An Advanced Oxidation Technology, RGF Environmental Group, Inc., Florida, USA, Copyright 2004, Printed from the Internet.

(Continued)

*Primary Examiner*—N. Bhat
(74) *Attorney, Agent, or Firm*—Joshua L. Cohen

(57) ABSTRACT

This invention is a modular, adjustable, easy to maintain, portable or fixed food sanitation tunnel, comprising an enclosing means for subjecting food to sanitizers including UV light, ozone, hydroperoxides, superoxides and hydroxyl radicals, and a method for using the system. The enclosing means includes one or more UV radiation sources and one or more target rods located within a tunnel, such as a c-shaped shell. The UV radiation sources are preferably UV light sources that emit UV light of approximately 185 to 254 nm. The target rods are approximately up to 0–30% titanium dioxide, up to 0–30% silver and up to 0–30% copper, by weight. The system may include a mister for the efficient production of hydroxyl radicals by the UV light sources. Parts of the system are easily removable for cleaning and for maintenance. Also, in an alternative embodiment, the tunnel is located on a frame, and the frame is on wheels.

13 Claims, 13 Drawing Sheets

U.S. PATENT DOCUMENTS

| | | | |
|---|---|---|---|
| 4,534,282 A | 8/1985 | Marinoza | 99/451 |
| 4,536,332 A | 8/1985 | Davis et al. | 260/97.6 |
| 4,547,197 A | 10/1985 | Winkler | 23/302 T |
| 4,615,799 A | 10/1986 | Mortensen | |
| 4,621,195 A | 11/1986 | Larsson | 250/438 |
| 4,627,388 A | 12/1986 | Buice | |
| 4,661,264 A | 4/1987 | Goudy, Jr. | 210/748 |
| 4,694,179 A | 9/1987 | Lew et al. | 250/431 |
| 4,708,775 A | 11/1987 | McGregor et al. | |
| 4,766,321 A | 8/1988 | Lew et al. | 250/431 |
| 4,798,702 A | 1/1989 | Tucker | 422/24 |
| 4,857,277 A | 8/1989 | Broomfield | |
| 4,872,980 A | 10/1989 | Maarschalkerweerd | 210/243 |
| 4,892,712 A | 1/1990 | Robertson et al. | |
| 4,898,679 A | 2/1990 | Siegel et al. | |
| 4,899,056 A | 2/1990 | Ellner | 250/431 |
| 4,899,057 A | 2/1990 | Koji | 250/436 |
| 4,915,038 A | 4/1990 | Sujata et al. | |
| 4,922,114 A | 5/1990 | Boehme | 250/436 |
| 4,957,050 A | 9/1990 | Ho | |
| 4,968,489 A | 11/1990 | Peterson | 422/186.3 |
| 4,968,891 A | 11/1990 | Jhawar et al. | 250/438 |
| 4,971,687 A | 11/1990 | Anderson | 210/85 |
| 5,006,244 A | 4/1991 | Maarschalkerweerd | 210/243 |
| 5,035,784 A | 7/1991 | Anderson et al. | |
| 5,037,618 A | 8/1991 | Hager | 422/186.03 |
| 5,112,477 A | 5/1992 | Hamlin | |
| 5,114,670 A | 5/1992 | Duffey | 422/24 |
| 5,126,111 A | 6/1992 | Al-Ekabi et al. | |
| 5,141,636 A | 8/1992 | Flanagan et al. | 210/209 |
| 5,144,146 A | 9/1992 | Wekhof | 250/492.1 |
| 5,145,515 A | 9/1992 | Gallup et al. | 75/712 |
| 5,150,705 A | 9/1992 | Stinson | 128/396 |
| 5,156,098 A | 10/1992 | Camp | |
| 5,166,527 A | 11/1992 | Solymar | 250/436 |
| 5,186,907 A | 2/1993 | Yanagi et al. | 422/186.3 |
| 5,200,156 A | 4/1993 | Wedekamp | 422/186.3 |
| 5,207,921 A | 5/1993 | Vincent | 210/704 |
| 5,208,461 A | 5/1993 | Tipton | 250/436 |
| 5,213,759 A * | 5/1993 | Castberg et al. | 422/24 |
| RE34,298 E | 6/1993 | Gitman et al. | |
| 5,230,792 A | 7/1993 | Sauska et al. | 210/97 |
| 5,266,215 A | 11/1993 | Engelhard | 210/748 |
| 5,288,461 A | 2/1994 | Gray | 422/24 |
| 5,290,439 A | 3/1994 | Buchwald | 210/198.1 |
| 5,308,505 A | 5/1994 | Titus et al. | 210/745 |
| 5,320,749 A | 6/1994 | Mullen | 210/199 |
| 5,326,539 A | 7/1994 | Taylor | |
| 5,342,482 A | 8/1994 | Duesel, Jr. | |
| 5,352,359 A | 10/1994 | Nagai et al. | 210/192 |
| 5,366,705 A | 11/1994 | Reidy | 422/243 |
| 5,368,826 A | 11/1994 | Weltz et al. | 422/243 |
| 5,376,281 A | 12/1994 | Safta | |
| 5,393,419 A | 2/1995 | Tiede et al. | 210/192 |
| 5,397,552 A | 3/1995 | Weigold et al. | |
| 5,401,394 A | 3/1995 | Markham | 210/85 |
| 5,405,631 A * | 4/1995 | Rosenthal | 426/235 |
| 5,413,768 A | 5/1995 | Stanley, Jr. | 422/186.3 |
| 5,418,370 A | 5/1995 | Maarschalkerweerd | 250/431 |
| 5,422,487 A | 6/1995 | Sauska et al. | 250/436 |
| 5,440,131 A | 8/1995 | Hutchison et al. | 250/435 |
| 5,471,063 A | 11/1995 | Hayes et al. | 250/436 |
| 5,504,335 A | 4/1996 | Maarschalkerweerd | 250/435 |
| 5,505,904 A | 4/1996 | Haidinger et al. | 422/24 |
| 5,529,689 A | 6/1996 | Korin | 210/232 |
| 5,532,549 A | 7/1996 | Duzyk et al. | 313/489 |
| 5,539,209 A | 7/1996 | Maarschalkerweerd | 250/436 |
| 5,540,848 A | 7/1996 | Engelhard | 210/748 |
| 5,547,635 A | 8/1996 | Duthie, Jr. | 422/24 |
| 5,560,958 A | 10/1996 | Duzyk et al. | 427/67 |
| 5,573,666 A | 11/1996 | Korin | 210/232 |
| 5,580,461 A | 12/1996 | Cairns et al. | 210/673 |
| 5,589,132 A | 12/1996 | Zippel | 422/24 |
| 5,590,390 A | 12/1996 | Maarschalkerweerd | 422/186.3 |
| 5,597,482 A | 1/1997 | Melyon | 210/209 |
| 5,611,918 A | 3/1997 | Markham | 210/87 |
| 5,612,001 A | 3/1997 | Matschke | 422/121 |
| 5,614,723 A | 3/1997 | Oppenländer | 250/435 |
| 5,624,573 A | 4/1997 | Wiesmann | 210/748 |
| 5,626,768 A | 5/1997 | Ressler et al. | 210/748 |
| 5,628,895 A | 5/1997 | Zucholl | 210/85 |
| 5,634,413 A | 6/1997 | Listner et al. | |
| 5,655,483 A | 8/1997 | Lewis et al. | 119/720 |
| 5,660,719 A | 8/1997 | Kurtz et al. | 210/85 |
| 5,669,221 A | 9/1997 | LeBleu et al. | |
| 5,675,153 A | 10/1997 | Snowball | 250/438 |
| 5,707,594 A | 1/1998 | Austin | |
| 5,744,094 A | 4/1998 | Castberg et al. | 422/24 |
| 5,753,106 A | 5/1998 | Schenck | 210/96.1 |
| 5,762,486 A | 6/1998 | Leger | |
| 5,768,905 A | 6/1998 | Oh | |
| 5,779,912 A | 7/1998 | G-Martin et al. | |
| 5,780,860 A | 7/1998 | Gadgil et al. | |
| 5,835,840 A | 11/1998 | Goswami | |
| 5,845,504 A | 12/1998 | LeBleu et al. | |
| 5,846,437 A | 12/1998 | Whitby et al. | 210/748 |
| 5,874,740 A | 2/1999 | Ishiyama | 250/431 |
| 5,885,449 A | 3/1999 | Bergmann et al. | 210/198.1 |
| 5,911,910 A | 6/1999 | Becraft et al. | 252/188.28 |
| 5,925,320 A | 7/1999 | Jones | 422/121 |
| 5,933,702 A | 8/1999 | Goswami | 422/186.3 |
| 5,937,266 A | 8/1999 | Kadoya | 422/186.3 |
| 5,942,110 A | 8/1999 | Norris | |
| 5,952,663 A | 9/1999 | Blatchley, III et al. | 250/435 |
| 5,958,336 A | 9/1999 | Duarte | 422/24 |
| 5,961,920 A | 10/1999 | Söremark | 422/24 |
| 5,997,812 A | 12/1999 | Burnham et al. | 422/24 |
| 6,013,917 A | 1/2000 | Ishiyama | 250/430 |
| 6,071,473 A | 6/2000 | Darwin | 422/20 |
| 6,083,387 A | 7/2000 | LeBlanc et al. | 210/199 |
| 6,090,296 A | 7/2000 | Oster | 210/748 |
| 6,093,676 A | 7/2000 | Heller et al. | |
| 6,117,337 A | 9/2000 | G-Martin et al. | |
| 6,120,691 A | 9/2000 | Mancil | 210/748 |
| 6,120,822 A * | 9/2000 | Denvir et al. | 426/320 |
| RE36,896 E | 10/2000 | Maaschalkerweerd | |
| 6,126,841 A | 10/2000 | Whitby et al. | 210/748 |
| 6,129,893 A | 10/2000 | Bolton et al. | 422/23 |
| 6,132,784 A * | 10/2000 | Brandt et al. | 426/248 |
| 6,149,343 A | 11/2000 | Lewis et al. | 405/127 |
| 6,150,663 A * | 11/2000 | Rosenthal | 250/435 |
| 6,153,151 A | 11/2000 | Moxley et al. | |
| 6,162,477 A * | 12/2000 | Crisinel et al. | 426/256 |
| 6,171,548 B1 * | 1/2001 | Rose et al. | 422/20 |
| 6,183,652 B1 | 2/2001 | Crevasse et al. | 210/748 |
| 6,193,939 B1 | 2/2001 | Kozlowski | 422/186.3 |
| 6,200,428 B1 | 3/2001 | VanKouwenberg | |
| 6,202,384 B1 | 3/2001 | Kurth et al. | 53/141 |
| 6,217,834 B1 | 4/2001 | Hosein et al. | 422/186.3 |
| 6,231,820 B1 | 5/2001 | Wedekamp | 422/186.3 |
| 6,234,092 B1 | 5/2001 | Domschke et al. | |
| 6,248,235 B1 | 6/2001 | Scott | |
| 6,261,449 B1 | 7/2001 | Scott | 210/209 |
| 6,264,802 B1 | 7/2001 | Kamrukov et al. | 204/158.2 |
| 6,264,888 B1 | 7/2001 | Palestro et al. | 422/24 |
| 6,265,835 B1 | 7/2001 | Parra | 315/246 |
| 6,274,049 B1 | 8/2001 | Scott | 210/748 |
| 6,279,493 B1 | 8/2001 | Beaumont et al. | |
| 6,280,615 B1 | 8/2001 | Phillips et al. | 210/198.1 |
| 6,299,844 B1 | 10/2001 | Tao et al. | 422/186 |
| 6,309,542 B1 | 10/2001 | Kim | |
| 6,319,809 B1 | 11/2001 | Chang et al. | 438/597 |
| 6,328,937 B1 | 12/2001 | Glazman | 422/186.3 |
| 6,332,981 B1 | 12/2001 | Loyd | 210/198.1 |

| | | | | | |
|---|---|---|---|---|---|
| 6,358,478 B1 | 3/2002 | Söremark ............... 422/121 | 6,605,260 B1 | 8/2003 | Busted ............... 422/186.3 |
| 6,375,833 B1 | 4/2002 | Marston et al. ........... 210/85 | 6,610,258 B1 | 8/2003 | Strobbel et al. ...... 422/186.3 |
| 6,398,971 B1 | 6/2002 | Butters et al. ........... 210/748 | 6,682,697 B1 * | 1/2004 | He et al. .................. 422/29 |
| 6,402,964 B1 | 6/2002 | Schmid .................. 210/748 | 6,784,440 B1 * | 8/2004 | Fink et al. ............... 250/435 |
| 6,403,030 B1 | 6/2002 | Horton, III .............. 422/24 | 2002/0033369 A1 | 3/2002 | Bender |
| 6,404,111 B1 | 6/2002 | Kunkel .................. 313/24 | 2002/0043504 A1 | 4/2002 | Chen et al. |
| 6,419,821 B1 | 7/2002 | Gadgel et al. ............ 210/86 | 2002/0050479 A1 | 5/2002 | Scott |
| 6,423,763 B1 | 7/2002 | Blasi .................... 523/161 | 2002/0070177 A1 | 6/2002 | Kozlowski |
| 6,436,299 B1 | 8/2002 | Baarman et al. ......... 210/748 | 2002/0081246 A1 | 6/2002 | Tsukada et al. |
| 6,447,720 B1 | 9/2002 | Horton, III et al. ........ 422/24 | 2002/0094298 A1 | 7/2002 | Monagan |
| 6,447,721 B1 | 9/2002 | Horton, III et al. ........ 422/24 | 2002/0098127 A1 | 7/2002 | Bollini |
| 6,454,937 B1 | 9/2002 | Horton et al. ........... 210/192 | 2002/0144955 A1 | 10/2002 | Barak et al. |
| 6,454,952 B1 | 9/2002 | Thorpe .................. 210/748 | 2002/0170815 A1 | 11/2002 | Fujii |
| 6,459,087 B1 | 10/2002 | Kaas .................... 250/372 | 2002/0172627 A1 | 11/2002 | Aoyagi |
| 6,461,520 B1 | 10/2002 | Engelhard et al. ........ 210/748 | 2003/0010927 A1 | 1/2003 | Wedekamp |
| 6,464,884 B1 | 10/2002 | Gadgil .................. 210/748 | 2003/0021721 A1 | 1/2003 | Hall |
| 6,468,419 B1 | 10/2002 | Kunkel .................. 210/90 | 2003/0035750 A1 | 2/2003 | Neuberger |
| 6,497,840 B1 | 12/2002 | Palestro et al. ........... 422/24 | 2003/0039576 A1 | 2/2003 | Hall |
| 6,500,312 B1 | 12/2002 | Wedekamp ............ 204/157.15 | 2003/0049809 A1 | 3/2003 | Kaiser et al. |
| 6,500,346 B1 | 12/2002 | Taghipour et al. ........ 210/748 | 2003/0064001 A1 | 4/2003 | Fries et al. |
| 6,500,387 B1 | 12/2002 | Bigelow .................. 422/24 | 2003/0089670 A1 | 5/2003 | Saccomanno |
| 6,503,401 B1 | 1/2003 | Willis ................... 210/748 | 2003/0099569 A1 | 5/2003 | Lentz et al. |
| 6,503,447 B1 | 1/2003 | Mondjian et al. ............ 422/4 | 2003/0127603 A1 | 7/2003 | Horowitz et al. |
| 6,534,001 B1 | 3/2003 | Michael et al. ............ 422/24 | 2003/0129105 A1 | 7/2003 | Boehme |
| 6,537,494 B1 * | 3/2003 | Garlick ................... 422/27 | 2003/0147770 A1 | 8/2003 | Brown et al. |
| 6,546,883 B1 | 4/2003 | Fink | 2003/0147783 A1 | 8/2003 | Taylor |
| 6,547,963 B1 | 4/2003 | Tsai ..................... 210/232 | 2003/0150708 A1 | 8/2003 | Fink |
| 6,565,757 B1 | 5/2003 | Wedkamp ............... 210/748 | 2003/0155228 A1 | 8/2003 | Mills et al. |
| 6,565,803 B1 | 5/2003 | Bolton et al. ............. 422/24 | 2003/0155524 A1 | 8/2003 | McDonald et al. |
| 6,568,489 B1 | 5/2003 | Hailey .................. 422/186.3 | 2003/0198716 A1 * | 10/2003 | Hankinson et al. ......... 426/248 |
| 6,576,188 B1 * | 6/2003 | Rose et al. ................ 422/20 | 2004/0052702 A1 * | 3/2004 | Shuman et al. ............ 422/208 |
| 6,583,422 B1 | 6/2003 | Boehme ................ 250/432 R | | | |
| RE38,173 E | 7/2003 | Ishiyama | | | |
| 6,589,323 B1 | 7/2003 | Korin .................... 96/223 | | | |
| 6,589,489 B1 | 7/2003 | Morrow et al. ......... 422/186.3 | | | |
| 6,589,490 B1 | 7/2003 | Parra ................... 422/186.3 | | | |
| 6,599,487 B1 | 7/2003 | Luthra et al. ........... 422/186.3 | | | |
| 6,602,425 B1 | 8/2003 | Gadgil et al. ............ 210/744 | | | |

OTHER PUBLICATIONS

EPA, Ultraviolet Radiation. http//www.epa.gov/safewater/mdbp/pdf/alter/chapt-8.pdf. Apr. 1999. Section 8.1.1.

* cited by examiner

FIG. 16
FIG. 17
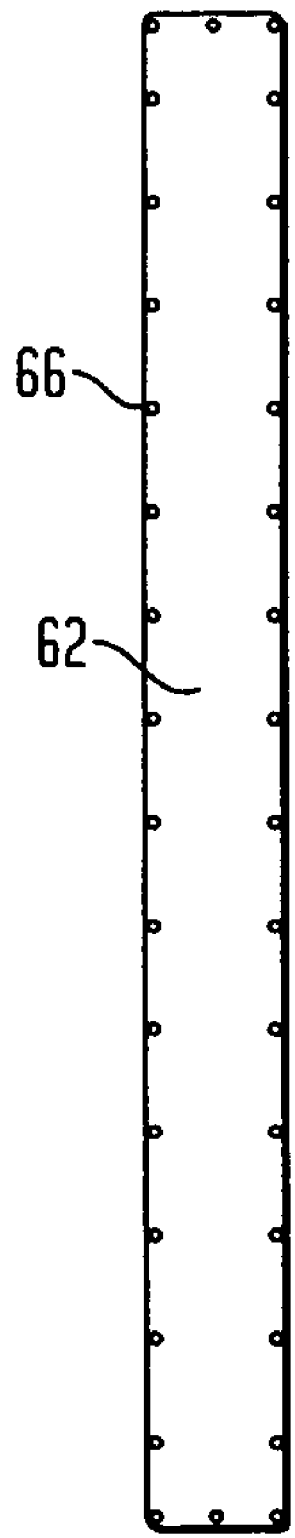
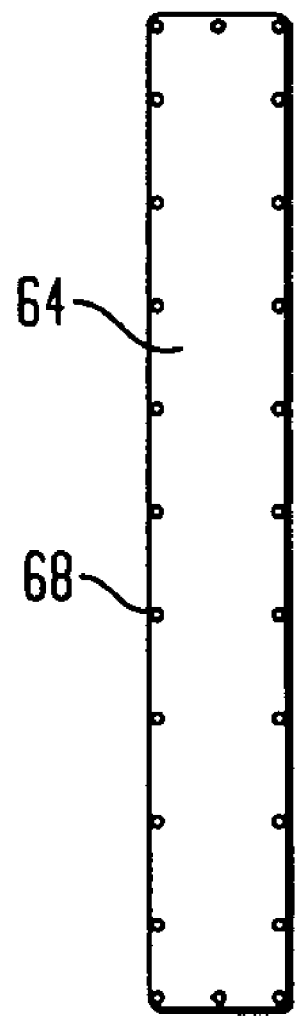

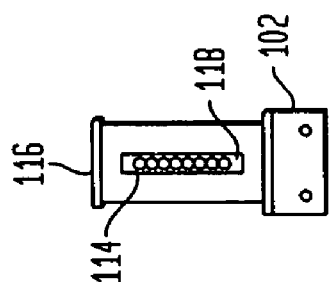
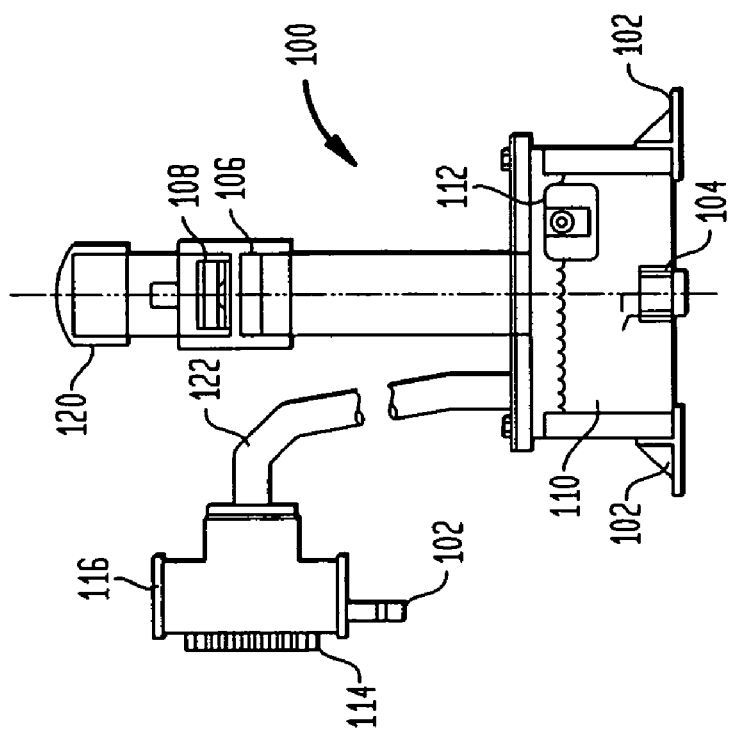
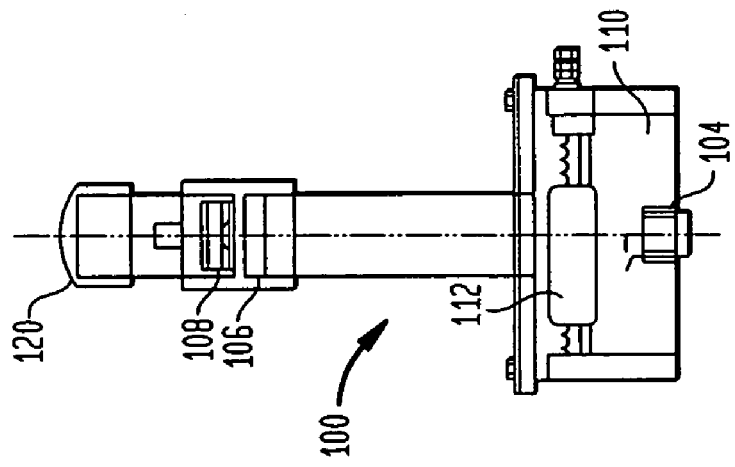

FOOD SURFACE SANITATION TUNNEL

BACKGROUND OF INVENTION

1. Field of the Invention

The present invention relates to the simultaneous sanitation of several food surfaces and more particularly pertains to industrial modular, compact, efficient systems and devices for sanitizing foods during processing and packaging, especially those processed on assembly lines. The present invention also relates to foods sanitized by such systems and devices.

2. Description of Related Art

Food sanitation is a growing concern in the world. More and more aggressive disease-causing agents are discovered every year. In addition, an increasing number of people are made ill each year by eating contaminated foods. Also, the numbers of foods linked to food-caused illnesses continues to increase. Nonetheless, the desire for safer foods is higher than ever. In fact, more and more state and federal jurisdictions are requiring that businesses use the most efficacious food safety and sanitation practices.

Efficient use of modern sanitization techniques decreases the cost of applying them. These savings, when passed to the consumer, mean the consumers spend less on the processed foods. Also, efficient sanitizing techniques can allow more food to be processed in a smaller amount of space. Thus, smaller facilities may compete with larger ones, thereby increasing competition between processors and lowering prices to consumers. In addition, facilities that use less-safe processing techniques may be easily retrofit to install an efficient apparatus. Furthermore, modularity in a sanitizing system or device makes it easy to manufacture and easy to replace parts.

Sanitizing radiation allows a highly controllable application of organism-killing radiation to foods and food additives. The use of sanitizing radiation in the food industry in general is well known in the prior art, and has been used in a variety of forms, including gamma ray radiation, ultraviolet (UV) light and infrared radiation.

For example, it is well known that gamma radiation and UV radiation has been used in some countries for the sterilization of spices and animal feeds. However, over-use of ultraviolet radiation may cause undesirable chemical reactions with a food or food additive, which can cause the food or food additive to obtain undesirable flavors or textures. Also, various vitamins and proteins may be altered or destroyed through being subjected to too much radiation, reducing the food value of the treated product.

Traditional methods of irradiating foods processed or packaged in assembly line manner use an unnecessary amount of radiation, as well as space, in a food processing facility. Furthermore, they fail to take full advantage of the combined use of ozone, UV light, hydroperoxides, superoxides and hydroxyl radicals in the sanitization process. For example, U.S. Pat. No. 6,150,663 to Rosenthal teaches a system incorporating an irradiation system using radiation, and only radiation, to sanitize food. Rosenthal also teaches vibration of the food to optimize radiation exposure to all of the food surfaces. The entire system is inefficient and ineffective, as irradiation alone may not properly sanitize food, and there is no sanitization of more than one side at the same time. In addition, if there were a slight fold on the food surface, the shaded food surface would never be sanitized. However, ozone, hydroperoxides, superoxides and hydroxyl radical ions are able to get beneath a fold and sanitize a folded over food surface. Furthermore, hydroperoxides, superoxides, ozone and hydroxyl radical ions, when used together, reduce the amount of radiation needed thereby decreasing radiation damage to food. Also, if the food were prepackaged so that vibration would topple the packaging, then the Rosenthal process would be contraindicated.

Thus, there is a need for a portable modular system that sanitizes more than one food surface simultaneously. There is also a need for a system that uses the sanitizing combination of radiation, ozone, hydroperoxides, superoxides and hydroxyl radicals, or one that makes it easy to apply or manufacture economically. There is also a lack of such a sanitizing system that may be retrofit into an existing assembly system. There is no system designed with modularity in mind, to suit different processes properly, or to provide easy manufacture or replacement of component parts. There is no system wherein the radiation, ozone, hydroperoxides, superoxides and hydroxyl radicals are optimized for food treatment. There is no system that efficiently utilizes sanitizing radiation, ozone, hydroperoxides, superoxides and hydroxyl radicals to sanitize processed and/or prepackaged foods. There is no system which adds regulated amounts of moisture to the enclosing sanitizing system to improve the efficiency of the formation of hydroperoxides, superoxides and hydroxyl radicals in sanitizing food. There is no such system that is easy to assemble, adjust, transport, clean, maintain and disassemble. There is no system using sanitizing radiation, ozone, hydroperoxides, superoxides and hydroxyl radicals that is adjustable on a frame with wheels, or that uses sanitizers on more than one side simultaneously. In other words, there is no system that takes advantage of the sanitizing and free-moving characteristics of a combination of radiation with ozone, hydroperoxides, superoxides and hydroxyl radicals to improve sanitization beyond what mere radiation can perform.

SUMMARY OF INVENTION

The present invention is a modular, adjustable, portable, easy to maintain food sanitation tunnel system, having an enclosing means for simultaneously subjecting food on at least two sides to sanitizers including UV light, ozone, and plasma including hydroperoxides, superoxides and hydroxyl radicals. The enclosing means has one or more UV light sources and one or more target rods in optical proximity to the UV light sources. The UV radiation sources emit UV light of approximately 185 to 254 nm. In an alternative embodiment, the enclosing means further comprises drainage holes through a bottom surface.

In another embodiment, the target rods comprise up to approximately 0–30% titanium dioxide, up to 0–30% silver and up to 0–30% copper, by weight. In yet another embodiment, the system includes a mister for adding an optimized amount of mist in proximity to the target rods for the efficient production of hydroxyl radicals. In still another embodiment, hydroxyl radicals are generated in part from the moisture in the ambient air in the proximity of the target rods.

In yet another embodiment, a door at least partially encircles the food within a space defined by the enclosing means. The door is removably attached to an overhang of the enclosing means. In still another embodiment, the system includes an electrical box attached to the exterior of the enclosing means, and the electrical box has a removable cover plate.

In another embodiment, the enclosing means is C-shaped. In yet another embodiment, the system has alternating UV light sources and target rods. In still another embodiment, the enclosing means is approximately 46 inches in width. In yet still another embodiment, the target rods are of modular construction.

In yet another embodiment, the UV light source is located within an assembly. In another embodiment, the assembly includes a reflector tube and a shield, and the assembly is of modular construction. In still another embodiment, the target rods and the assemblies are easy to manufacture, maintain and replace.

In yet still another embodiment, the system includes a rigid frame for the enclosing means, and a self-contained adjustable conveyor. In another embodiment, the system includes a ballast housing and a control box located on the frame, and the frame has wheels.

In yet another embodiment, the UV light sources and the target rods surround the food in a rectangular or triangular shape. In still another embodiment, the frame is adaptable to allow the enclosing means to be optimally located in relation to the food.

In still another embodiment, the invention is a food sanitation tunnel, comprising means for subjecting food to sanitizing radiation, means for subjecting food to ozone and means for subjecting food to a sanitizing plasma, whereby the food is subjected to the radiation, the ozone and the plasma generally simultaneously. In yet another embodiment, the means for subjecting food to sanitizing radiation, the means for subjecting food to ozone and the means for subjecting food to sanitizing plasma includes one or more sanitizing radiation sources located in an assembly and one or more target rods in optical proximity to the assemblies. In yet still another embodiment, the assemblies and the target rods are modular in construction, easy-to-clean and easy-to-maintain. In addition, the tunnel is generally portable. The assemblies and target rods are in generally triangular orientation, a c-shaped configuration, or other preferred orientation.

In still another embodiment, the tunnel includes an enclosing structure, and a door is removably attached to an upper portion of the enclosing structure.

In yet another embodiment, the invention is a method for sanitizing food comprising the exposing of a food surface within an enclosure simultaneously to UV light, ozone, and sanitizing plasma. In another embodiment, the invention is the food sanitized by the method above.

It is an object of this invention to provide a portable modular system that sanitizes more than one side of a food surface simultaneously.

It is another object of this invention to provide a modular system makes utilization of the sanitizing combination of radiation, ozone, hydroperoxide, superoxide and hydroxyl radicals easy to apply or manufacture economically, or to fit into an existing system.

It is still another object of the invention to provide a system designed with modularity in mind, and to provide easy manufacture or replacement of component parts.

It is yet another object of the invention to provide a system wherein the radiation, ozone, hydroperoxide, superoxide and hydroxyl radicals are combined and optimized for food treatment.

It is yet still another object of the invention to provide a system that efficiently utilizes sanitizing radiation, ozone, hydroperoxide, superoxide and hydroxyl radicals to sanitize processed and/or prepackaged foods during processing and packaging.

It is still another object of the invention to provide a system which adds moisture to the sanitizing system to improve the efficiency of the formation of a sanitizing plasma for sanitizing food.

It is yet another object of the invention to provide a system that is easy to assemble, adjust, transport, clean, maintain and disassemble.

It is still another object of the invention to provide a system using sanitizing radiation, ozone, hydroperoxide, superoxide and hydroxyl radicals that is adjustable on a frame.

It is yet still another object of the invention to provide a system that takes advantage of the sanitizing and free-moving characteristics of the combination of sanitizing radiation, ozone, hydroperoxide, superoxide and hydroxyl radicals to improve sanitization beyond what mere radiation can perform.

In accordance with these and other objects which will become apparent hereinafter, the instant invention will now be described with particular reference to the accompanying drawings.

BRIEF DESCRIPTION OF DRAWINGS

FIG. 16 is a side elevation view of a cover plate for the top and bottom concave portions of the center box of the invention.

FIG. 17 is a side elevation view of a cover plate for the side concave portion of the center box of the invention.

FIG. 19 is a front elevation view of the mister used in an alternative embodiment of the invention.

FIG. 20 is a side elevation view of the mister used in an alternative embodiment of the invention.

FIG. 21 is a detailed view of the mist header used in an alternative embodiment of the invention.

DETAILED DESCRIPTION

The present invention is a modular, adjustable, portable, easy to maintain food sanitation tunnel system, shown generally in FIGS. 1–4 at 10. The system includes an enclosing means of a predetermined geometry, such as a c-shaped tunnel 12 for simultaneously subjecting food on at least two sides to sanitizers including UV light, ozone, and a sanitizing plasma including hydroperoxides, superoxides and hydroxyl radicals. Attached to the inside surface of the tunnel 12 are one or more sanitizing radiation sources, such as UV light sources 14, and one or more target rods 16 that are located within the tunnel 12 in optical proximity to the UV light sources 14.

Preferably the tunnel 12 is made from a rigid, food safe material, such as stainless steel. The tunnel 12 is placed around the food to be sanitized, so that sanitizers touch the food on at least two sides. It is preferred that the food is passed through the tunnel 12 along a conveyor. Where sanitization of the food comes from below the conveyor, it is preferred that the conveyor allow the sanitizers to pass through the conveyor. For example, the conveyor may be a mesh or webbing, or be at least translucent to ionizing radiation, or both.

Figure 5:
FIG. 5 is a side elevation view of a UV light source of the invention.
Figure 8:
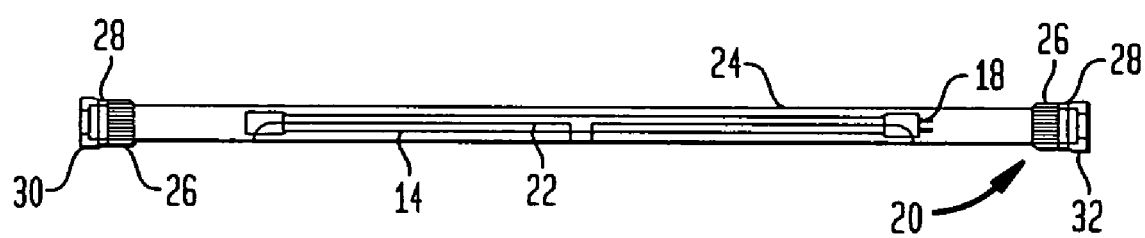
FIG. 8 is a side elevation view of a UV light assembly of the invention.

The sanitizing radiation sources are preferably generally cylindrical UV light sources 14, such as low vapor mercury lamps that emit UV light of approximately 185 to 254 nm. However, other sanitizing radiation sources such as medium or high vapor mercury lamps may be used. Thus, both high energy and medium to low energy UV light is preferably used. It is also preferred that the UV light source 14 have its electrical connectors 18 on one end rather than on both ends of the UV lamps 14, as shown in FIGS. 5 and 8. This configuration facilitates cleaning of the system 10, the use of protective conduits for wiring throughout the system, and replacement of the UV light sources 14. However, other sanitizing radiation sources in other configurations may be used.

Also, in the preferred embodiment, the UV light source 14 is located within an assembly 20, as shown in FIGS. 1–3 and 8. The assembly 20 makes replacement of the UV light sources 14 easier, acts as a barrier to protect both the UV light source 14 and the food it sanitizes, and reflects UV light to make the UV light source 14 a more efficient sanitizer. The assembly 20 is preferably made as described below.

Figure 6A:
FIG. 6A is a side elevation view of a reflecting tube of the invention.
Figure 6B:
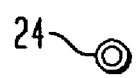
FIG. 6B is an end elevation view of a reflecting tube of the invention.

Around the UV light source 14 is preferably a generally cylindrical reflector tube 22, as shown in FIGS. 6A, 6B and 8. The tube 22 has a highly reflective interior surface, so the UV light from the UV light source 14 is reflected onto the food and the vicinity of the target rod 18. Also, it is preferred that the tube 22 be rigid to help in securing the connection of the UV light source 14 onto the interior of the tunnel 12. The reflector tube 22 is positioned so that at least some UV light that would otherwise be emitted by the UV light source 14 in a direction away from the food is redirected generally toward the target rod 18, the air around the food, or the food itself, to optimize the sanitization process. It is also preferred that the reflector tube 22 is of a shape designed so that the UV light source's radiation is not obstructed. In addition, the interior geometry of the reflector tube 22 may be altered to optimize reflection of the UV light onto the target rod 18, the air around the food, or the food itself. The preferred material for the tube 22 is aluminum; however, other metals may be used, or a reflective coating may be placed on the interior surface of a rigid, generally cylindrical piece.

Figure 7:
FIG. 7 is a side elevation view of a shield of the invention.

Around the UV light source 14 and the reflector tube 22, fused, is preferably a shield 24, shown in FIGS. 7 and 8. The shield 24 protects the food from any material that may possibly fall into the food if the UV light source 14 breaks. Preferably, the shield 24 is a transparent, generally flexible cylinder made from fluorocarbon. However, other equivalent materials may be used.

In the preferred embodiment, as shown in FIG. 8, on each end of the shield 24 is an endcap fitting 26. Each endcap fitting 26 is generally cylindrical and allows each end of the shield 24 to fit at least partway within it. Around each endcap fitting 26 is a means for forming a compressive seal, such as a gasket 28. On the far end of each endcap fitting 26 is either a closed endcap 30 or an open endcap 32. These endcaps are illustrated in FIGS. 1–4 and 8. A closed endcap 30 is preferred for the end of the UV light source 14 that has no electrical connectors 18 to protect the UV light source 14 and is preferably opaque to reduce radiation escaping from the tunnel 12. An open endcap 32 is preferred for the end of the UV light source 14 that has electrical connectors 18 to provide access to wiring and electronics for the UV light sources 14. In the preferred embodiment, the endcap fittings 26 and the endcaps 30, 32 have complementary threads, so that screwing the endcaps 30, 32 onto the endcap fittings 26 compresses the compressive seal.

The compressive seal around the assembly 20 helps keep the UV light within the tunnel 12, and protects the assembly 20 from the outside environment. The rigid reflector tube 22 are preferred to be sufficiently rigid to help provide resistance for screwing the endcaps 30, 32 onto the endcap fittings 26 in forming the compressive seal. The reflector tube 22 also forms a support for the shield 24 so that the shield 24 does not contact the UV light source 14 during maintenance and cause the UV light source 14 to break.

Figure 1:
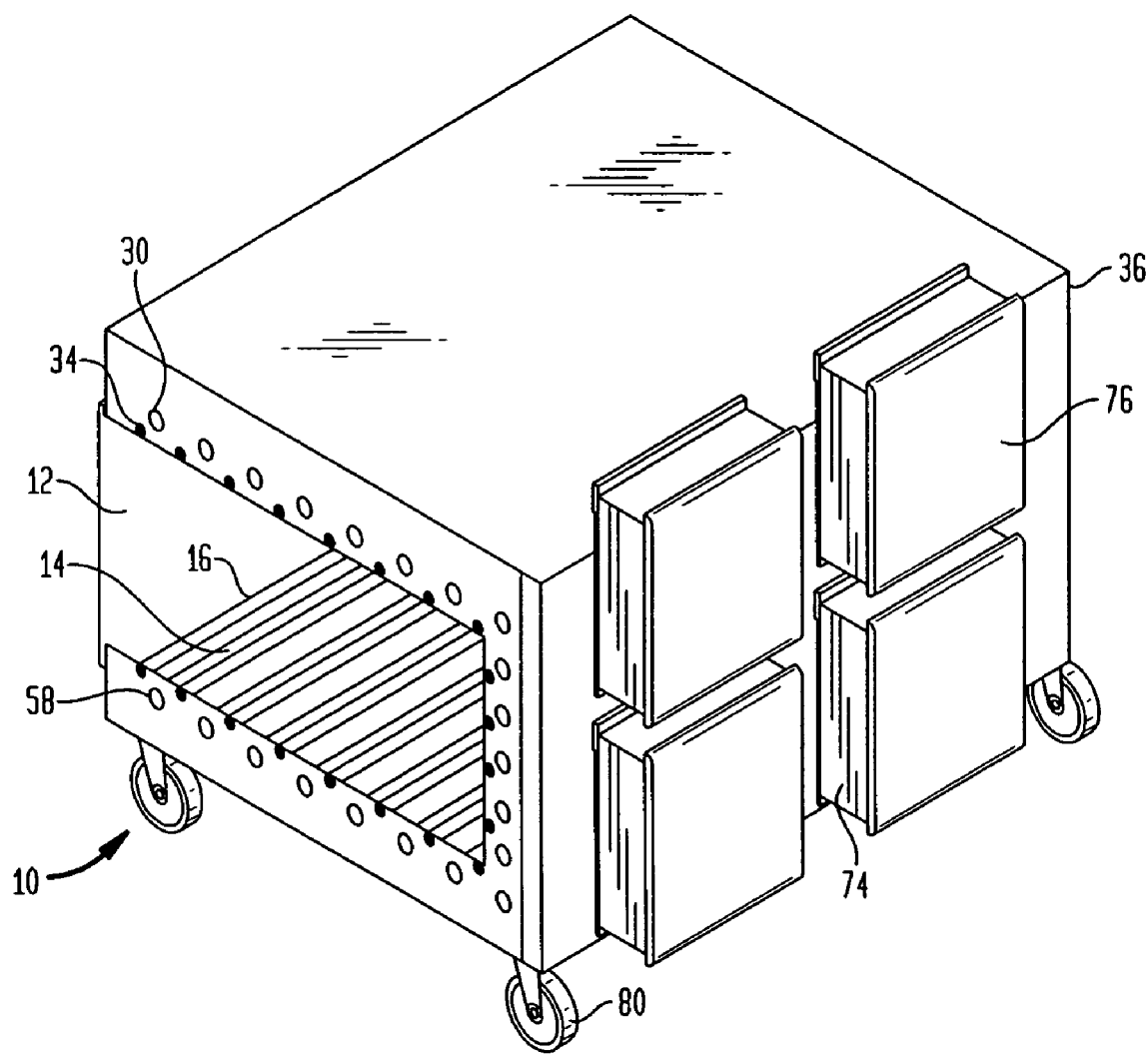
FIG. 1 is a front perspective view of the preferred embodiment of the invention.
Figure 2:
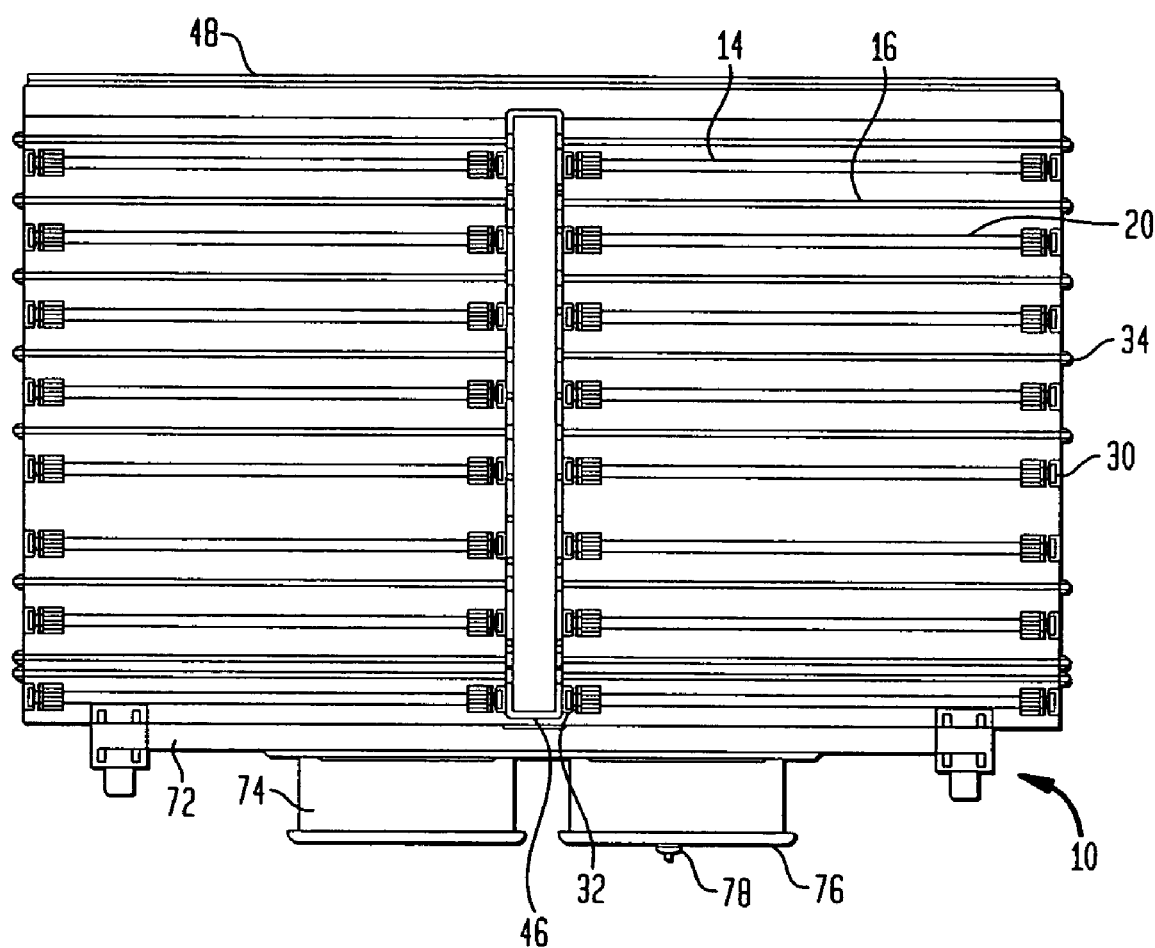
FIG. 2 is a cut away top view of the preferred embodiment of the invention, revealing the UV light sources.
Figure 3:
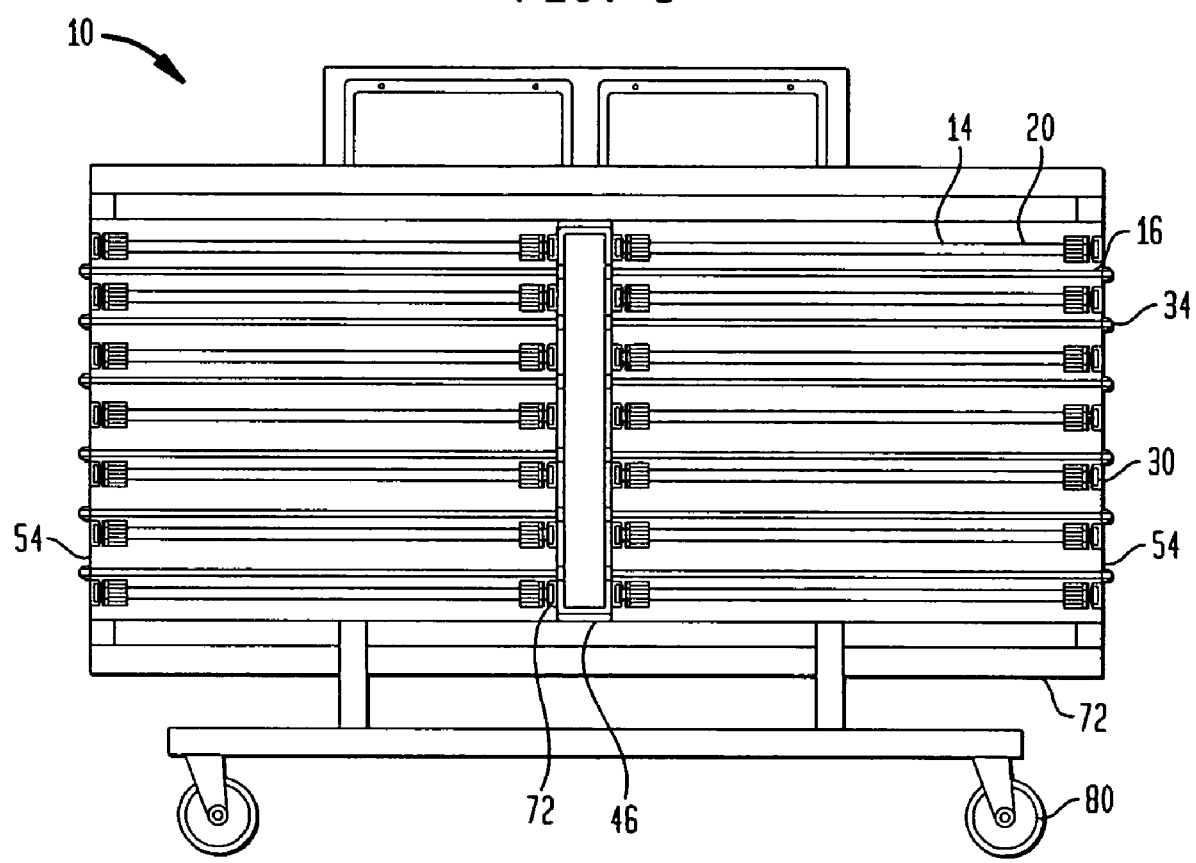
FIG. 3 is a front elevation view of the preferred embodiment of the invention, without the optional door.
Figure 4:
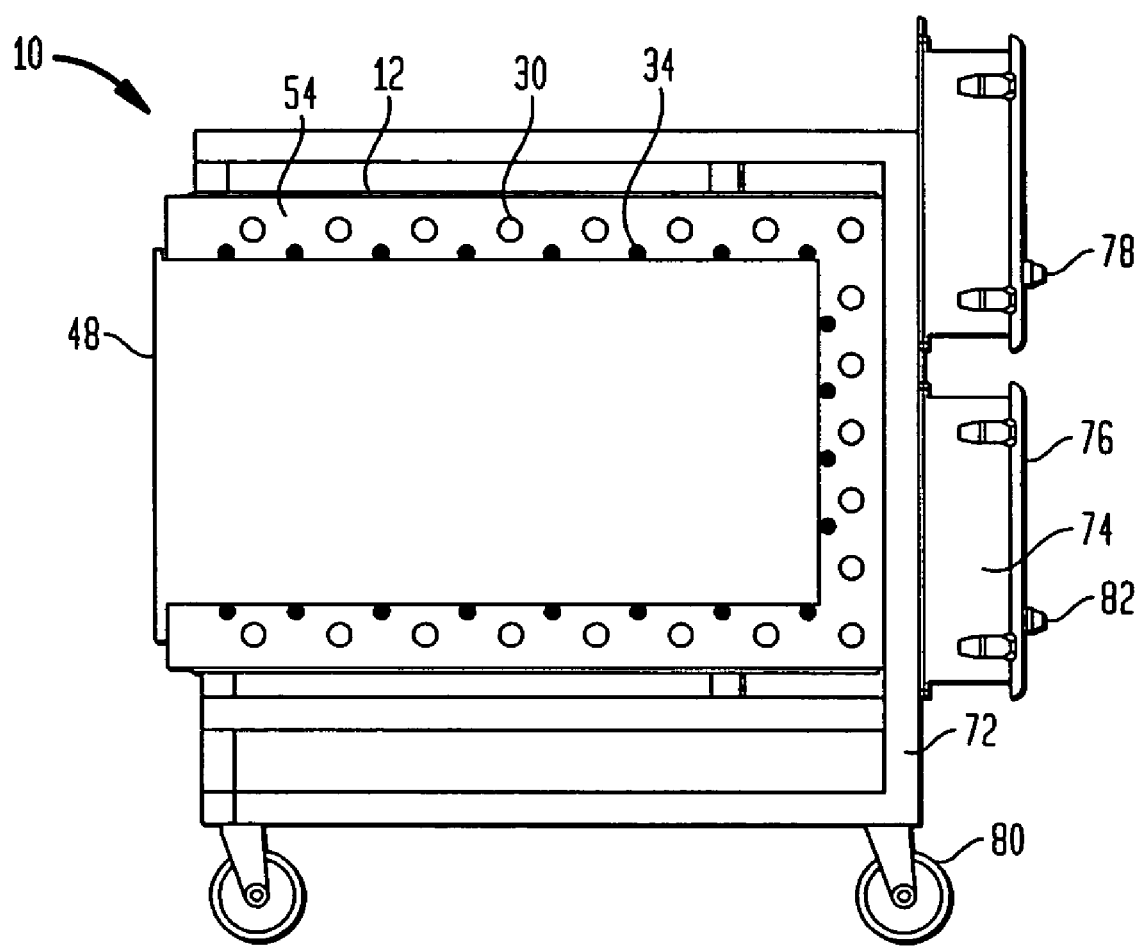
FIG. 4 is a side elevation view of the preferred embodiment of the invention.

Shown in FIGS. 1 4, in optical proximity to the UV light sources 14 and attached to the inner surface of the tunnel 12 is at least one generally cylindrical target rod 16. The target rods 16 are generally parallel to the UV light sources 14. The target rod 16 preferably comprises up to approximately up to 0–30% titanium dioxide, up to 0–30% silver and up to 0–30% copper, by weight, and attached to a stainless steel substrate. The number of target rods 16 and UV light sources 14 is dependent upon the amount of sanitization desired as well as the size of the area to be sanitized. As shown in FIGS. 1–4, the target rods 16 are offset and evenly interspersed between the UV light sources 14. However, other geometry may be preferred for different sanitization processes, so long as sufficient UV light reaches the target rods 16 to help form the sanitizing plasma.

As shown in FIGS. 1–4, target rods 16 are placed within the interior portion of the tunnel 12, and are held in place by endcaps 34. Thus, the target rods 16 are like the UV light assemblies 20, in that both are modular and easily accessible for replacement or maintenance. However, both the UV light assemblies 20 and the target rods 16 alternatively may be hung or secured onto the interior of the tunnel 12 by means not including any endcaps.

The UV light source itself helps sanitize the food. The UV light also interacts with oxygen to form ozone, which also helps sanitize the food. Moreover, the UV light also interacts with moisture and the target rod 16 to form hydroxyl radicals, superoxides and hyperoxides in a plasma that helps sanitize the food. The UV light generally helps to increase the amount of hydroxyl radicals, superoxides and hyperoxides. Moisture for use with the target rods 16 may exist naturally in the area of the tunnel 12.

Alternatively, moisture may be added by a separate mister 100, shown in FIGS. 19 and 20, either attached to or in proximity to the tunnel 12. The mister is preferably mounted onto the tunnel 12 with a mounting bracket 102, although it may be situated so that it applies mist toward the food without being attached to the tunnel 12. Water is preferably excited by an ultrasonic mist former 104. The mister 100 also preferably includes mist eliminator 106 mesh means for eliminating mist between the means for moving air onto the food, (such as a fan 108) and the reservoir 110 of water. The output of the fan 108 can be regulated with a flow controller 120. The level of the reservoir 110 is preferably regulated by a float valve 112. It is preferred that the material for the mist eliminator 106 is polypropylene or an equivalent material. The mist flows from a flexible tube 122 or equivalent means to a mist outlet 114. The mist outlet 114 means for controlling the amount of mist applied toward the food is also preferred. As detailed in FIG. 21, it is located on a mist header 116. Also, an adjustable vent block 118 is used in conjunction with a mist header 116 to control the amount of mist emitted.

Figure 9:
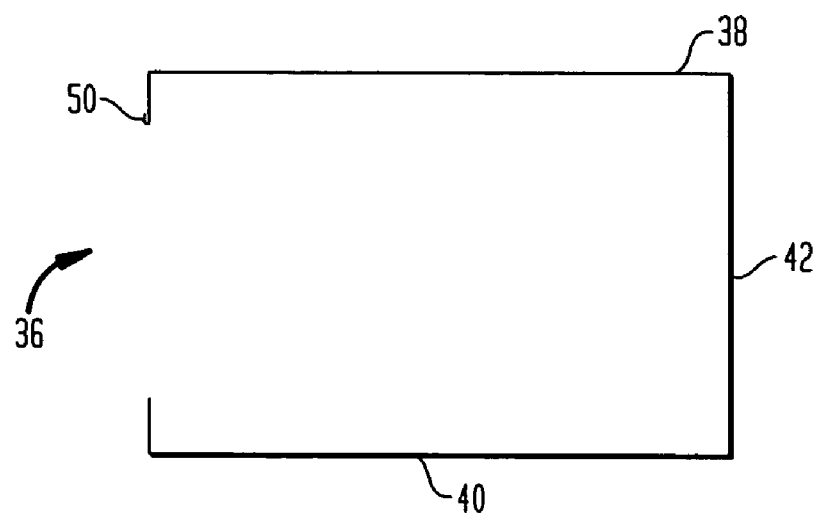
FIG. 9 is a side elevation view of the shell of the invention.

As shown in FIGS. 1 and 9, in the preferred embodiment, the tunnel 12 comprises a shell 36, preferably made of an easy to maintain rigid material, such as stainless steel. The shell 36 includes a top portion 38, a bottom portion 40 and a side portion 42.

Figure 10:
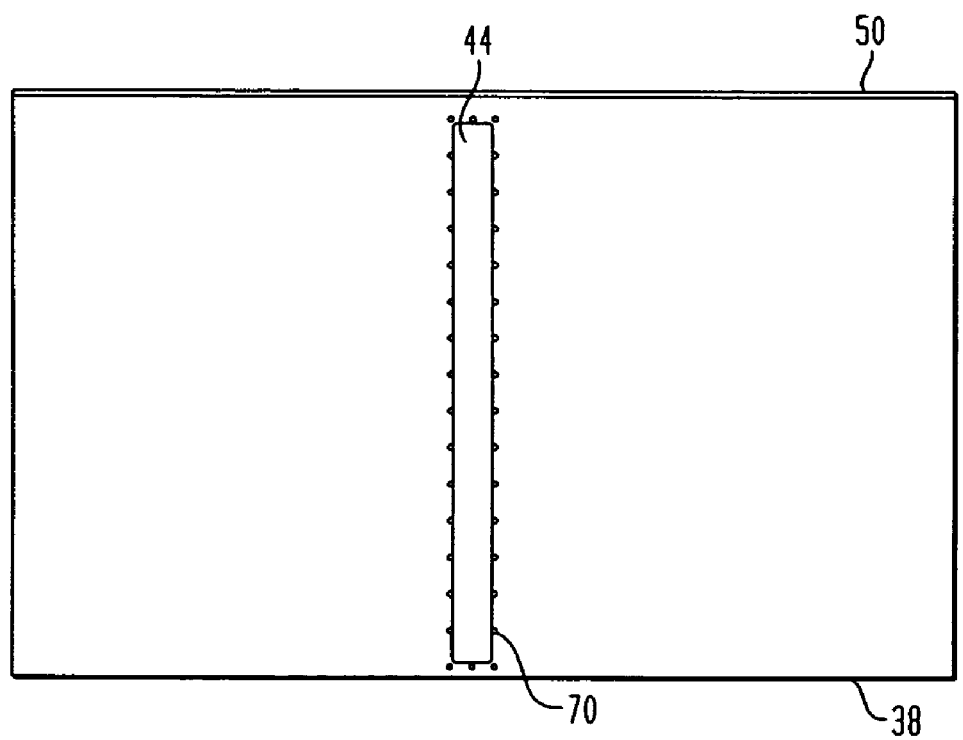
FIG. 10 is a top plan view of the top section of the shell of the invention.
Figure 11:
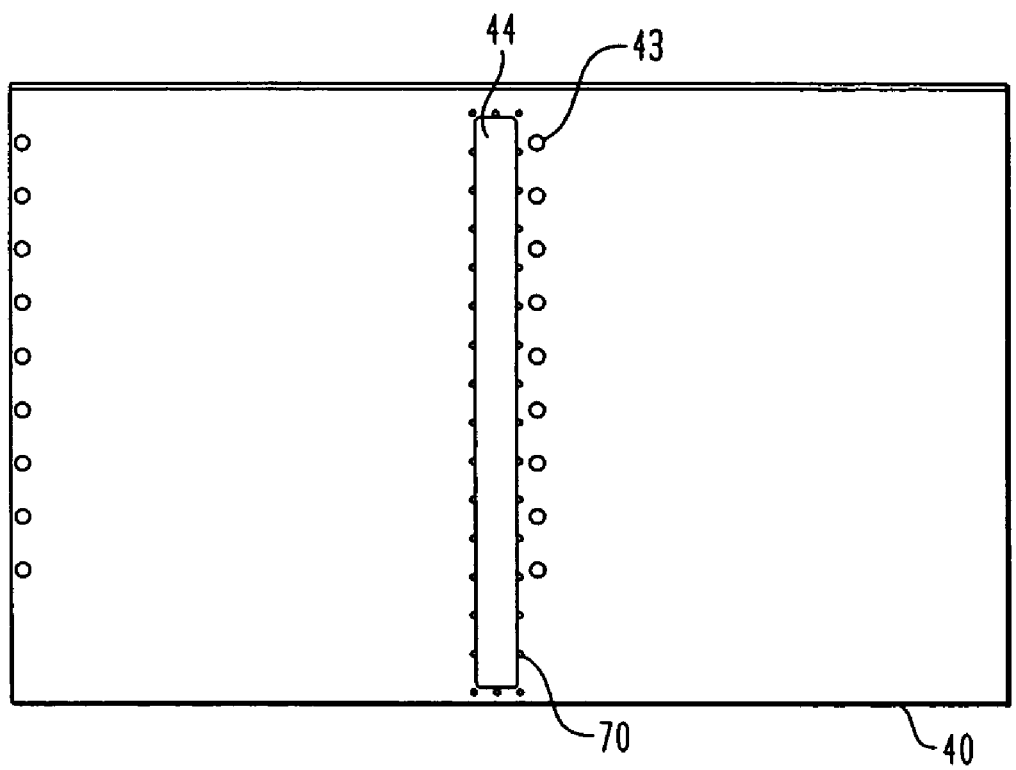
FIG. 11 is a top plan view of the bottom section of the shell of the invention.
Figure 12:
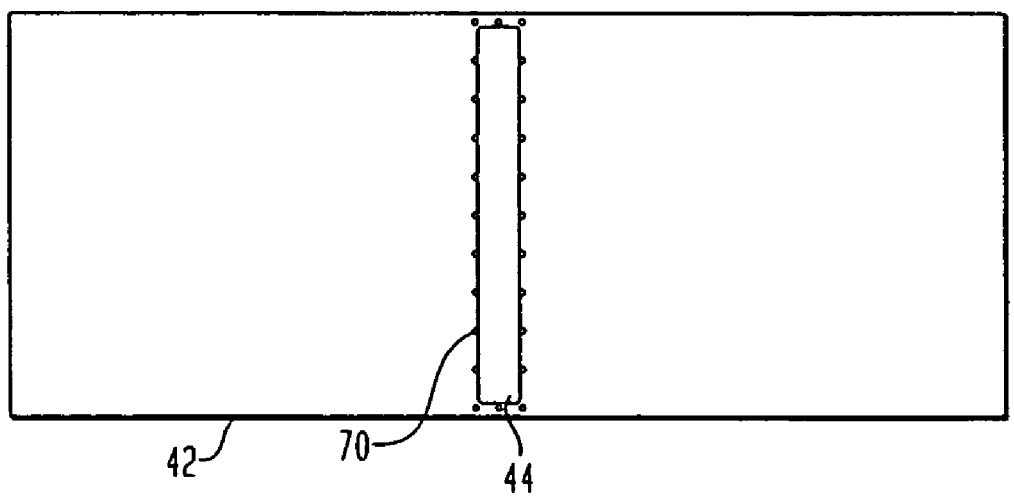
FIG. 12 is a top plan view of the side section of the shell of the invention.

Preferably the top portion 38, bottom portion 40 and side portion 42 are separately manufactured in pieces as shown in FIGS. 10–12, respectively. The portions 38, 40, 42 are then joined together, either permanently or temporarily. The preferred method of attachment is welding. In addition, as shown in FIG. 11, one or more drain holes 43 are drilled through the bottom portion 40, for any fluids that may drip from the food. It is preferred that the drain holes 43 are approximately one inch in diameter.

Figure 14A:
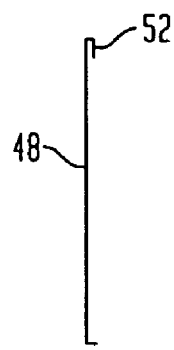
FIG. 14A is a side elevation view of a door for the shell of the invention.
Figure 14B:
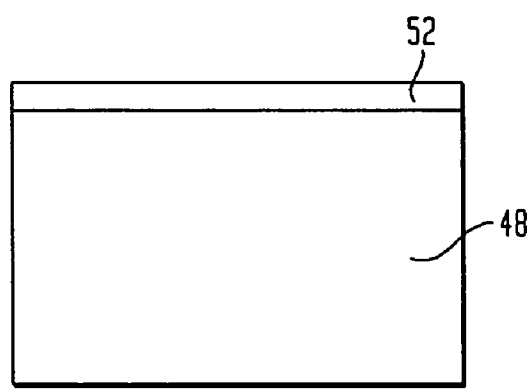
FIG. 14B is a front elevation view of a door for the shell of the invention.

In an alternative embodiment, as shown in FIGS. 14A and 14B, a door 48 is attached to the front side of the top portion 38 of the shell 36. The door 48 may be removably or permanently attached. Moreover, the door 48 may be hingeably attached or removable from the shell 36. To facilitate attachment of a door 48, the top portion 40 of the shell 36 may further comprise a lip 50, so that the door 48 may hang from it by a complementary flange 52. The door would be superfluous where UV light sources 14 and target rods 16 surround the food.

Figure 13A:
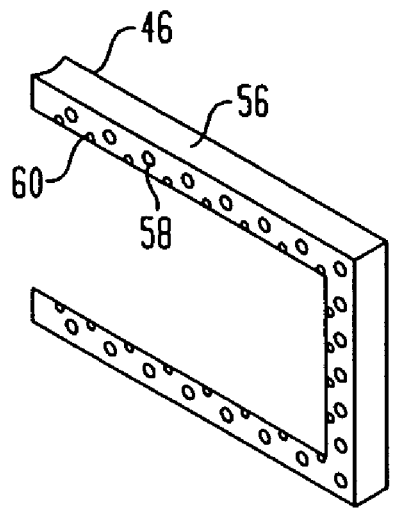
FIG. 13A is a perspective view of the center box of the invention.
Figure 13B:
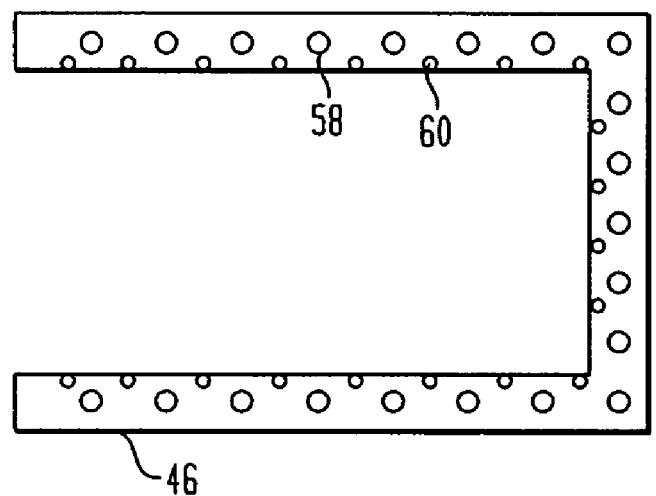
FIG. 13B is a side elevation view of the center box of the invention.
Figure 13C:
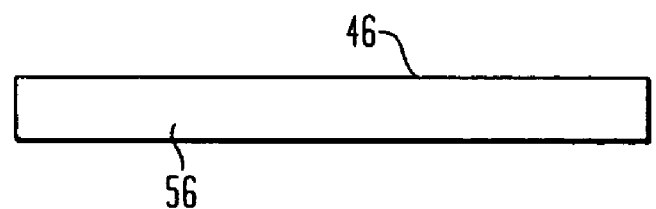
FIG. 13C is an end elevation view of the center box of the invention.

Attached to the top, bottom, and side portions 38, 40, 42 of the shell 36 are means for attaching the UV light sources 14 and target rods 16 to the shell 36 of the tunnel 12. In the preferred embodiment, as shown in FIGS. 2 and 3, at least one center box 46 and end pieces 54 are attached to the top, bottom and side portions 38, 40, 42 of the shell 36. The center box 46 is a generally c-shaped member shown generally in FIGS. 13A–13C. It is preferably made from a rigid material, such as stainless steel. It is also preferred that the center box 46 is attached to the shell 36 by welding; however, other means such as screws or rivets may be used. As shown in FIG. 13A, the back of the center box 46 preferably includes a concave section 56. Support holes 58 for supporting the UV light sources 14 and their assemblies 20 are drilled through the concave section 56. Thus, the concave section 56 may serve as a conduit for wiring and electronics for the UV light sources 14. The holes 58 are preferred to be complementary to the endcap fitting 26 and the open endcap 28 for an assembly 20, so the assemblies are held in place. In addition, voids 60 for accommodating the target rods 16 are also drilled through the center box 46. The rods 16 are preferably held in place by having the target rod endcap 34 located on the concave portion 56 of the center box 46.

Figure 15:
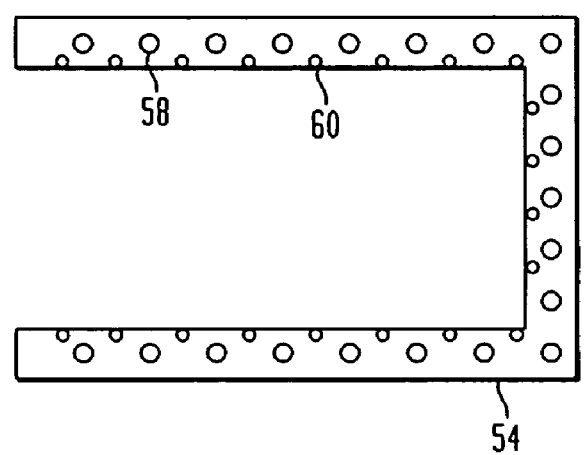
FIG. 15 is a side elevation view of an endpiece for the shell of the invention.

Endpieces 54, as shown in FIG. 15, are also preferably attached to the top, middle, and bottom portions 38, 40, 42 of the shell 36 by welding. Holes 58 in each endpiece 54 also help support the UV light sources 14 and the associated assemblies 20. Similarly, voids 60 are drilled through each of the endpieces 54 for supporting target rods 16 by the target rod endcaps 34. Thus, a target rod 16 and an assembly 20 are supported by both the center box 46 and an endpiece 54. In an alternative embodiment, a plurality of center boxes 46 may be used within an enlarged shell, and UV light sources 14 and target rods 16 may be supported by two serial center boxes 46, as well as a center box 46 and an end piece 54.

It is also preferred that a top and bottom cover plate 62 and a side cover plate 64, as shown in FIGS. 16 and 17, are used to help protect elements within the concave portions 56 of the center box 46, such as wiring and other components. The cover plates 62, 64 are preferably removably attached by screws inserted in screw holes 66, 68 through the cover plates 62, 64 and in holes 70 through each portion of the shell 36, as shown in FIGS. 10–12. However, other attachment means, such as rivets or welding, are contemplated. Wiring and other electronics may run through holes in one or more cover plates.

Figure 18A:
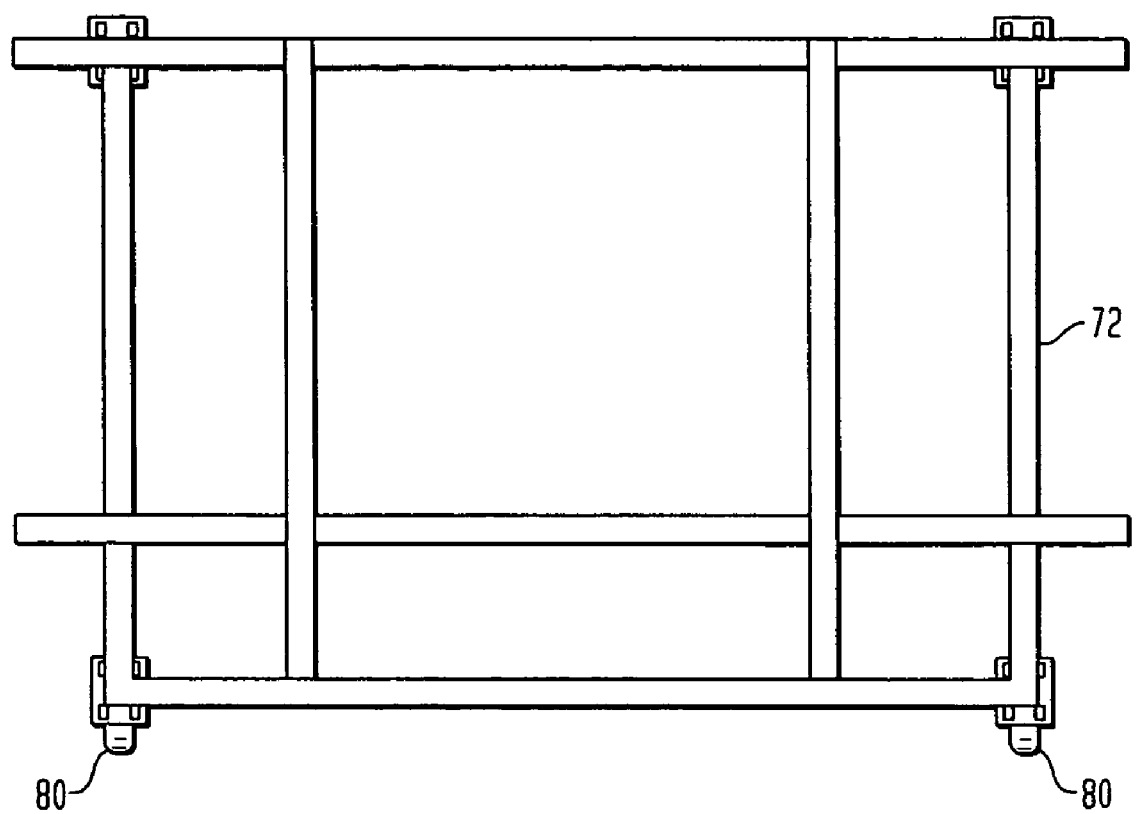
FIG. 18A is a top plan view of a frame for the invention.
Figure 18B:
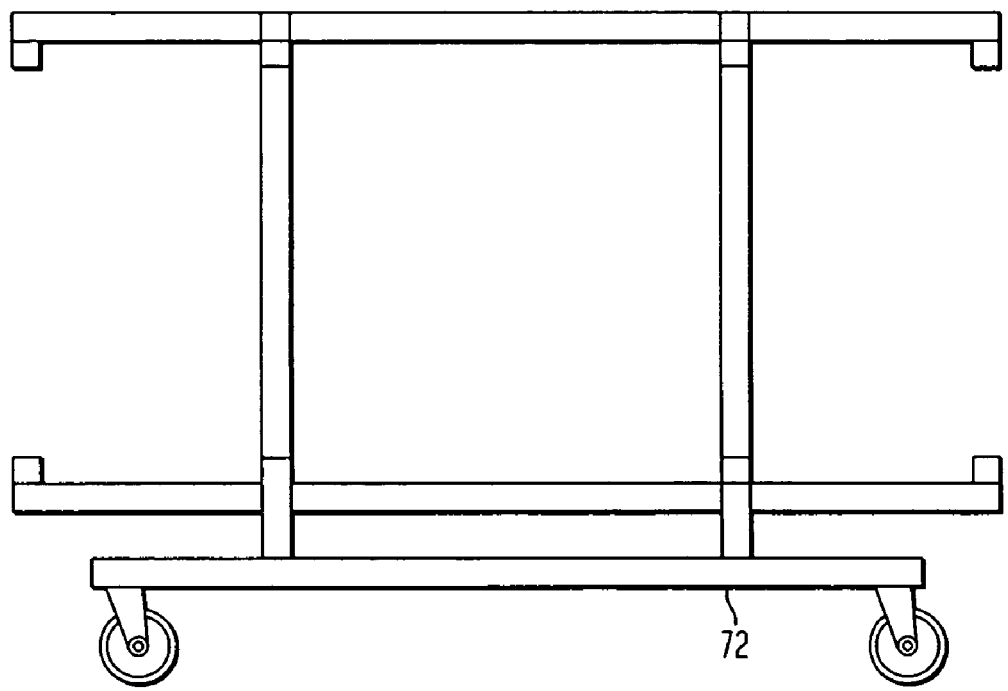
FIG. 18B is a side elevation view of a frame for the invention.
Figure 18C:
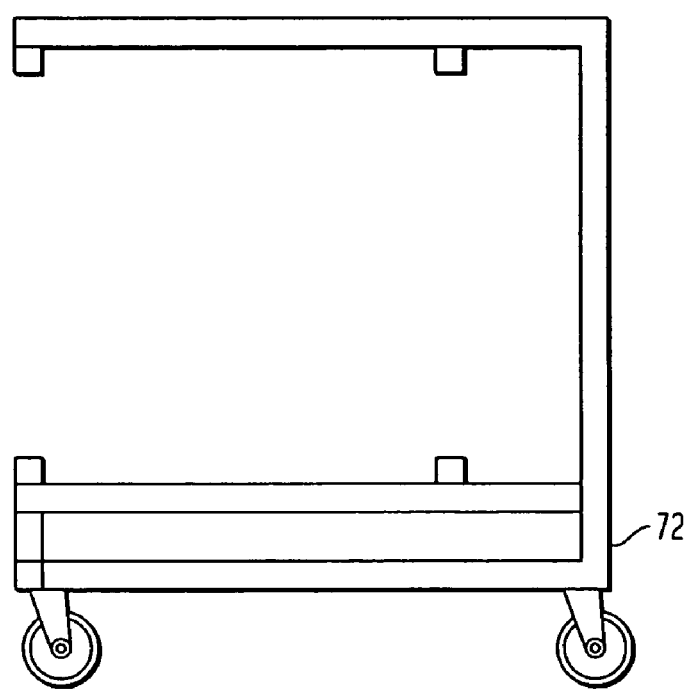
FIG. 18C is an end elevation view of a frame for the invention.

In one embodiment, shown in FIGS. 1–4, the shell 36 is attached to the upper portion of a rigid frame 72. The frame 72 alone is separately shown in FIGS. 18A–18C. The tunnel 12 is preferably adjustable vertically and horizontally in relation to the frame 72 to optimize sanitation of the food. Adjustment may be made hydraulically, electronically, or mechanically or by other equivalent means.

It is also preferred that the frame 72 includes one or more generally impermeable but easily accessible control boxes 74, shown in FIGS. 1–4. The control box 74 preferably has one or more removable cover panels 76 for access to the circuitry, and an on-off switch 78. Also, the control box 74 may include a lamp indicator light 82 to show whether power is being sent to the system 10. It is preferred that the frame 72 and cover panels 76 to the control box 74 and ballast housing are made of an easily cleanable material, such as stainless steel or aluminum.

In an alternative embodiment, the frame 72 is housed on wheels 80. Preferably, the wheels 80 are able to lock into position so the system 10 is portable yet fixable in a predetermined place.

In addition, while a c-shaped system 10 has been illustrated, other geometries are contemplated. For example, the elements contributing to the sanitization of the system 10 may be circular or triangular in orientation. Moreover, a full rectangular orientation of the elements may be used that does not require any door.

The apparatus sanitized food in accordance with the following procedure.

The food passes through the tunnel. The apparatus uses means for treating the food with UV light including UV-C light. Also, the apparatus treats the air around the food with UV light including UV-C light in the presence of a target to form a first set of chemical species. The apparatus then treats the products of the treated air in the presence of air with UV light including UV-C light to form a second set of chemical species. The first set of chemical species includes ozone, superoxides, and hydroxide radicals. The second set of chemical species includes hydroperoxides. The air to be treated usually includes latent water. However, water may be added to the air being treated by a mister to improve the performance of the apparatus.

In operation, a zone of plasma is created between the target and the UV light. The plasma includes air having hydroxyl radicals, ozone, hydroperoxides and super-oxides. Part of the reason the apparatus is so effective is that the high energy UV light helps create chemical species that have not been created before for food sanitization. Also, the interaction between the new chemical species, the ozone, and the cleansing UV light is synergistic, making a three part cleaning system that is highly effective for food sanitization. In addition, while the UV-C light creates ozone, the lower energy UV light emitted by the UV light source aids in the breakdown of the ozone molecules. Thus, the second chemical species has a higher concentration of hydroperoxides than would normally be formed from the breakdown of ozone without the energy UV light. Therefore, because of the apparatus' sanitizing plasmas, the food requires less exposure to UV light than would otherwise be necessary. Also, the plasma allows sanitization on irregular areas which might otherwise be shaded from UV light or other sanitizing radiation.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for sanitizing food comprising exposing a surface of the food within an enclosure generally simultaneously to UV light, ozone, and at least one target member for providing superoxides, hydroperoxides, and hydroxyl radicals.

2. A method for sanitizing food comprising general simultaneously exposing food to radiation, ozone, and at least one target member for providing plasma.

3. The method according to claim 2, wherein the exposing of the food occurs within an enclosure.

4. The method according to claim 2, wherein the plasma comprises a radical selected from the group consisting of a hydroperoxide, a superoxide, and a hydroxyl.

5. The method according to claim 4, wherein the hydroperoxide, superoxide and hydroxyl radicals are combined.

6. The method according to claim 2, further comprising packaging of the food.

7. The method according to claim 2, further comprising directing water mist toward the food.

8. A method for sanitizing food comprising exposing a surface of the food within an enclosure simultaneously to UV light, ozone, and at least one target member for providing a sanitizing plasma.

9. The method according to claim 8, including simultaneously sanitizing more than one side of the food surface.

10. The method according to claim 8, wherein the sanitizing plasma includes at least one of hydroperoxides, superoxides, or hydroxyl radicals.

11. The method according to claim 8, including applying a water mist to the enclosure to add moisture in the enclosure.

12. The method according to claim 11, including interacting UV light with oxygen in air to form ozone and with the moisture to form at least one of hydroxyl radicals, superoxides, hyperoxides, or hydroperoxides in the sanitizing plasma.

13. The method according to claim 11, including applying the water mist toward the food surface.

* * * * *